US005624339A

United States Patent [19]
Coutant et al.

[11] Patent Number: 5,624,339
[45] Date of Patent: Apr. 29, 1997

[54] METHOD FOR CONTROLLING SHIFT POINTS IN A CONTINUOUSLY VARIABLE TRANSMISSION

[75] Inventors: Alan R. Coutant, Chillicothe; Jerry D. Marr, Metamora, both of Ill.

[73] Assignee: Caterpillar Inc., Peoria, Ill.

[21] Appl. No.: 470,795

[22] Filed: Jun. 6, 1995

[51] Int. Cl.$^6$ ............................. F16H 37/08; F16H 47/04
[52] U.S. Cl. .................... 475/72; 475/76; 475/78
[58] Field of Search ............................. 74/730.1, 732.1; 475/72, 73, 76, 78, 80; 60/490

[56] References Cited

U.S. PATENT DOCUMENTS

| | | | |
|---|---|---|---|
| 4,291,592 | 9/1981 | Meyerle et al. | 74/687 |
| 4,896,563 | 1/1990 | Manor et al. | 475/80 X |
| 5,011,463 | 4/1991 | Jarchow et al. | 475/78 |
| 5,337,629 | 8/1994 | Kita | 475/72 X |
| 5,403,241 | 4/1995 | Jarchow et al. | 475/72 |
| 5,406,793 | 4/1995 | Maruyama et al. | 475/76 X |

*Primary Examiner*—Khoi Q. Ta
*Attorney, Agent, or Firm*—J. W. Burrows

[57] ABSTRACT

A method is disclosed for controlling the shift points in a continuously variable transmission having a closed loop control wherein the output of the continuously variable transmission is generated by a hydrostatic transmission or by a combination of the hydrostatic transmission and a mechanical transmission having a summing planetary and high and low speed clutches. The method comprises the steps of sensing the input and output speeds of the continuously variable transmission and the speed of the output from the hydrostatic transmission to monitor the speed ratios therein, comparing an operative transmission speed ratio of the transmissions to a predefined established transmission speed ratio, disengaging the high or low speed clutch once the predefined established transmission speed ratio is reached, increasing or decreasing the speed of the output of the hydrostatic transmission following disengagement of the high or low speed clutch, and engaging the other of the high or low speed clutch once the change in output speed of the hydrostatic transmission has substantially synchronized the speeds relative to the high or low speed clutches so that the output torque and speed of the transmission before and after the shift is substantially equal.

4 Claims, 3 Drawing Sheets

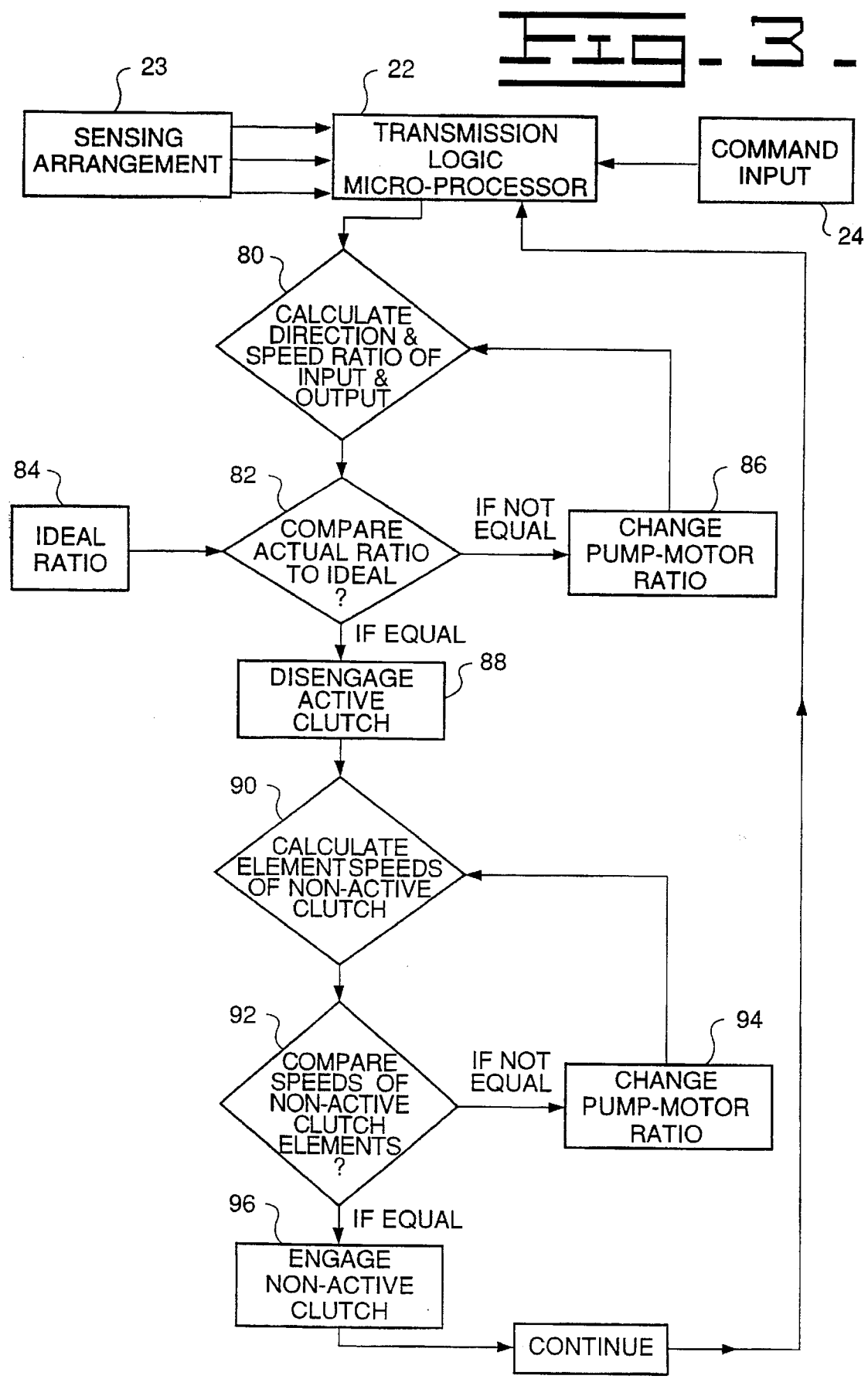

METHOD FOR CONTROLLING SHIFT POINTS IN A CONTINUOUSLY VARIABLE TRANSMISSION

TECHNICAL FIELD

This invention relates generally to the combined use of a hydrostatic transmission and a mechanical transmission to provide a continuously variable transmission and more particularly to controlling when the shift is made between the respective transmissions in order to obtain a smooth transition.

BACKGROUND ART

Various types of continuously variable transmissions have been used in the past. In most of these applications, only one type of transmission has been used. In order to obtain both high operating efficiencies and higher speed ranges, different types of transmissions have been combined into one system to meet the above noted requirements. Since different types of transmissions are used it is necessary to shift between the various types of transmissions during operation in order to achieve the desired speed and/or torque ranges. When the machine is operating under a load, it becomes difficult to achieve a smooth transition when shifting between the respective transmissions. Changes in speed levels or torque levels between the respective transmissions during the shift results in changes to the momentum of the machine and is objectionable to the operator. In some applications, this change in momentum results in a "jerk" during the transition.

The subject invention is directed to overcoming one or more of the problems as set forth above.

DISCLOSURE OF THE INVENTION

In one aspect of the present invention, a method is set forth for controlling the shift points in a continuously variable transmission with a closed loop control. The output of the continuously variable transmission being generated by a hydrostatic transmission and by a combination of the hydrostatic transmission and a mechanical transmission having a summing planetary and high and low speed clutches. The method comprises the steps of sensing the input speed to the continuously variable transmission, sensing the output speed from the hydrostatic transmission, sensing the output speed of the continuously variable transmission, comparing an operative transmission speed ratio of the hydrostatic transmission or the combined hydrostatic transmission and the mechanical transmission to a predefined established transmission speed ratio, disengaging the high or low speed clutch in response to the operative transmission speed ratio of the hydrostatic transmission or the combined hydrostatic transmission and mechanical transmission reaching the predefined established transmission speed ratio, increasing or decreasing the speed of the output of the hydrostatic transmission when input speed to the continuously variable transmission does not substantially equal the speed to the summing planetary or when the output speed of the hydrostatic transmission does not substantially equal the speed of output from the continuously variable transmission, and engaging the other of the high speed clutch or the low speed clutch in response to the speed of the input to the continuously variable transmission substantially equalling the speed to the summing planetary arrangement or the output speed of the hydrostatic transmission substantially equalling the speed of the output from the continuously variable transmission so that the speed and output torque of the transmission before and after the shift is substantially equal. The predefined established transmission speed ratio being the point of intersection of a predefined torque curve of the hydrostatic transmission with a predefined torque curve of the combined hydrostatic transmission and the mechanical transmission.

BRIEF DESCRIPTION OF THE DRAWINGS

FIG. 3 illustrates a flow chart setting forth the various operational steps.

BEST MODE FOR CARRYING OUT THE INVENTION

Figure 1:
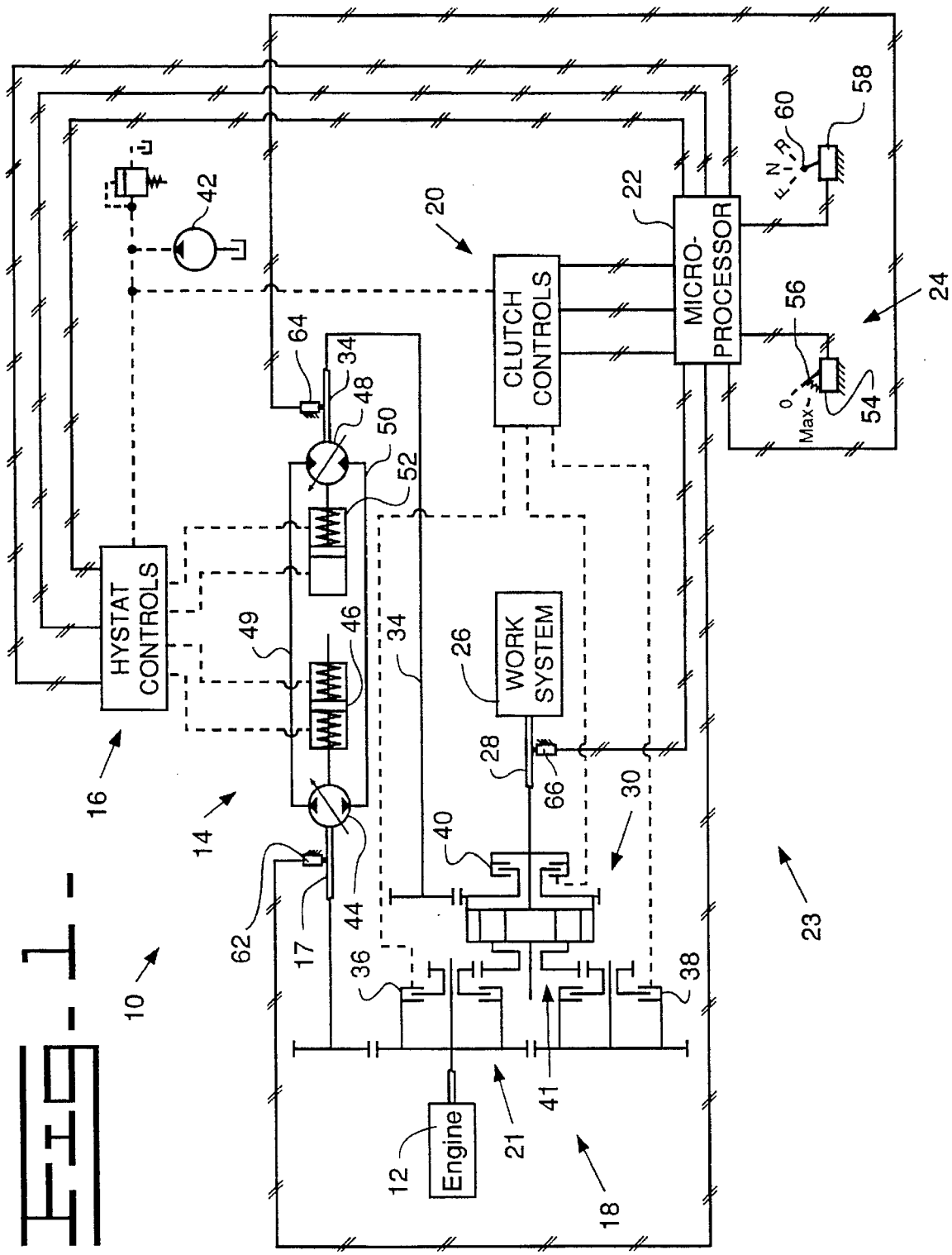
FIG. 1 is a part schematic and part diagrammatic illustration of a machine system which utilizes the subject method.

Referring to FIG. 1 of the drawings, a continuously variable transmission 10 is illustrated for use on a machine (not shown) having an engine 12. The continuously variable transmission 10 includes a hydrostatic transmission 14 and its associated hystat control arrangement 16 operatively connected to the engine 12 through a pump input drive shaft 17 and a mechanical transmission 18 and its associated clutch control arrangement 20 operatively connected to the engine 12 through a gear arrangement 21. The pump input drive shaft 17 and the gear arrangement 21 collectively being the input to the continuously variable transmission 10. The continuously variable transmission 10 also includes a microprocessor 22 operatively connected to the hystat control arrangement 16 of the hydrostatic transmission 14 and the clutch control arrangement 20 of the mechanical transmission 18, a sensing arrangement 23, and a command (operator's) input arrangement 24. A work system 26 is connected to the continuously variable transmission 10 by a final drive shaft 28.

The mechanical transmission 18 includes a summing planetary arrangement 30 operatively connected to both the engine 12 through the gear arrangement 21 and to the hydrostatic transmission 14 through a motor output shaft 34. The output of the summing planetary arrangement 30 is connected to the final drive shaft 28. The mechanical transmission 18 also includes directional, high speed clutches 36,38 and a low speed clutch 40. The directional, high speed clutches 36,38 are disposed between the gear arrangement 21 and an input arrangement 41 to the summing planetary arrangement 30. The low speed clutch 40 is disposed relative to the motor output shaft 34, the summing planetary arrangement 30 and the final output shaft 28 and is operative when engaged to rotate the motor output shaft 34, the input arrangement 41 to the summing arrangement 30 and the final output shaft 28 at the same speed. When the low speed clutch 40 is disengaged, the relative speeds of the input arrangement 41 to the summing arrangement 30, the motor output shaft 34, and the final output shaft 28 vary due to the summing planetary arrangement 30. The clutch control arrangement 20 is connected to a source of pressurized pilot fluid, such as a pilot pump 42 and the microprocessor 22 and operative in response to receipt of electrical signals from the microprocessor 22 to control engagement and disengagement of the respective speed clutches 36,38,40.

The hydrostatic transmission 14 includes a variable displacement pump 44 having a pump displacement controller 46, a variable displacement motor 48 fluidly connected to the variable displacement pump 44 by conduits 49,50 and having a motor displacement controller 52. The hystat control arrangement 16 is connected to the pilot pump 42 and the microprocessor 22 and operative in response to receipt of electrical signals from the microprocessor 22 to control movement of the respective pump and motor displacement controllers 46,52.

The command input arrangement 24 includes a speed input mechanism 54 having a speed pedal 56 movable from an initial zero position or maximum speed position to a maximum full travel position or zero speed position and a direction control mechanism 58 having a direction control lever 60 selectively movable from a neutral position to a forward or a reverse position.

The sensing arrangement 23 includes a first speed sensor 62 operative to sense the input speed to the continuously variable transmission 10 by sensing the speed of the pump input shaft 17 and direct an electrical signal representative thereof to the microprocessor 22. A second speed sensor 64 is operative to sense the speed of the motor output shaft 34 and direct an electrical signal representative thereof to the microprocessor 22. A third speed sensor 66 is operative to sense the speed of the final drive shaft 28 and direct an electrical signal representative thereof to the microprocessor 22. From the first, second and third speed sensors 62,64,66, the input speed to the continuously variable transmission 10, the speed of the gear arrangement 21, the speed of the input arrangement 41 to the summing arrangement 30 and the speed of the final output shaft 28 are individually monitored by the microprocessor 22.

Figure 2:
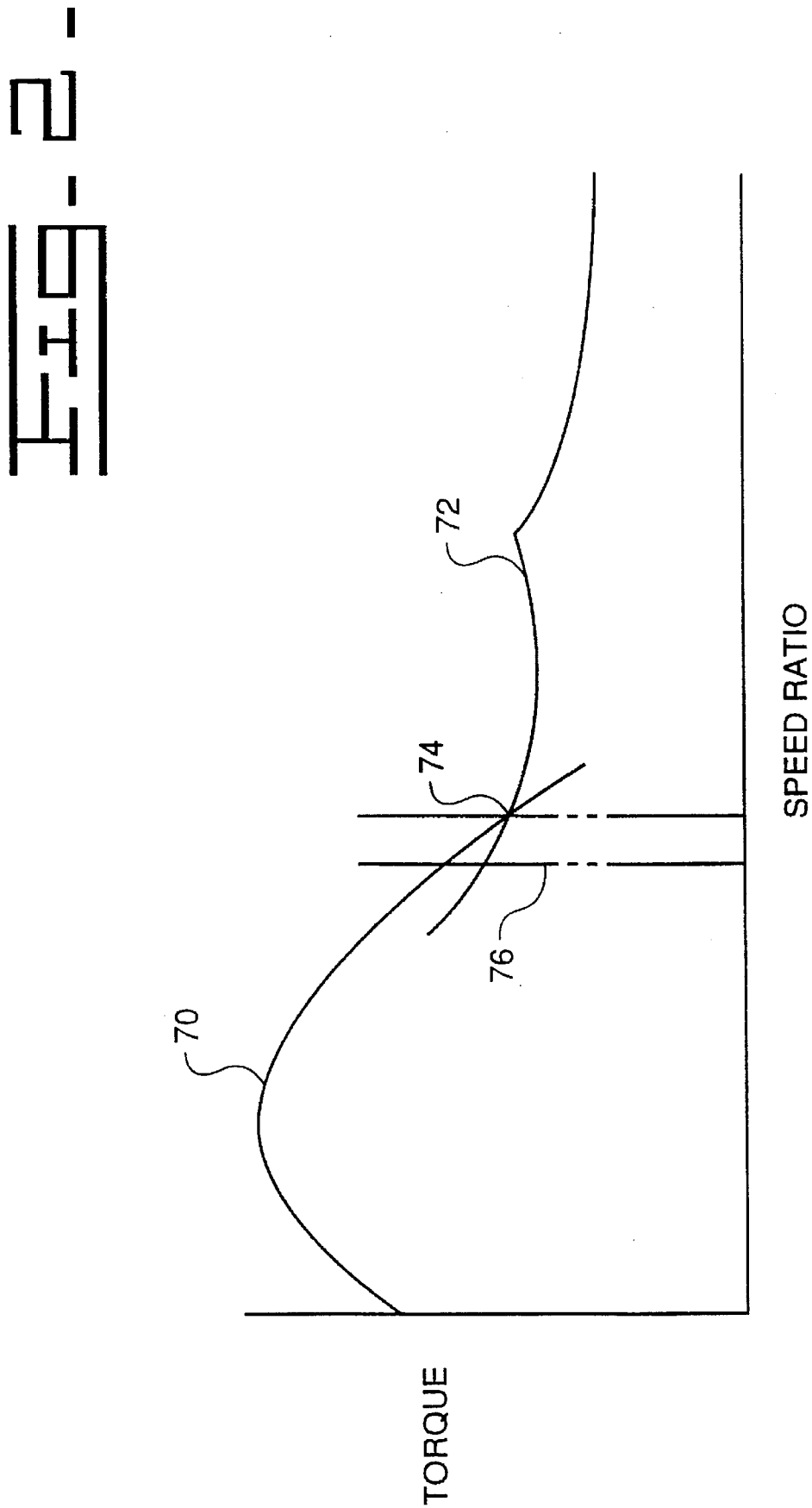
FIG. 2 is chart illustrating the relationship between the torque curves of two different types of transmissions.

Referring to the chart of FIG. 2, a first curve 70 illustrates a predefined torque curve for the hydrostatic transmission 14 as compared to specific speed rations of the continuously variable transmission 10. A second curve 72 illustrates a predefined torque curve for the combined hydrostatic transmission and mechanical transmission 18 as compared to specific speed rations of the continuously variable transmission 10. The first and second curves 70,72 intersect at a point 74 that represents a predefined established transmission speed ratio wherein the operating torques of both the hydrostatic transmission 14 and the combined hydrostatic and mechanical transmission 18 are substantially the same. The vertical line 76 represents a speed relationship at which the input speed to the continuously variable transmission 10, the speed of the input arrangement 41, the speed of the motor output shaft 34, and the speed of the final output shaft 28 are substantially the same or at what is referred to as the synchronous speed.

Referring to FIG. 3, a method for controlling the shift points is illustrated. The micro-processor or transmission logic 22 receives various signals representing system parameters from the sensing arrangement 23 and an input signal from the command input arrangement 24 that is representative of the operator's desire. A decision block 80 calculates the desired direction based on the command input 24 and calculates the speed ratio of the input and output 17,28 as sensed by the sensing arrangement 23. A decision block 82 compares the actual speed ratio determined in decision block 80 to the ideal or desired speed ratio of control block 84. If the actual speed ratio is not substantially equal, a control block 86 of the micro-processor 22 acts to direct a signal to the hystat controls 16 to change the ratio of the pump/motor 14. Subsequent to the change in the ratio of the pump/motor 14, decision block 80 again calculates the speed ratio of the input and output 17,28 and the decision block 82 compares the new speed ratio to the ideal speed ratio in control block 84. If the new speed ratio from decision block 80 is equal to or substantially equal to the ideal speed ratio, then a control block 88 of the micro-processor 22 acts to direct a signal to the clutch controls 20 to disengage the active clutch. After the active clutch is disengaged, a decision block 90 calculates the speed of the respective rotating elements of the non-active clutch. A decision block 92 compares the relative speeds of the rotating elements of the non-active clutch and if the speeds are not substantially equal, a control block 94 of the micro-processor acts to direct a signal to the hystat controls 16 to change the speed ratio of the pump/motor 14. Subsequent to the change in the speed ratio of the pump/motor, the decision block 90 again calculates the speed of the respective rotating elements of the non-active clutch and the decision block 92 compares the relative speeds of the elements. If the relative speeds of the rotating elements are substantially equal, a control block 96 of the microprocessor 22 acts to direct a signal to the clutch controls 20 to engage the non-active clutch. Once the non-active clutch is engaged, the control returns to the transmission logic or micro-processor 22 to wait until another shift transition is made.

It is recognized that various forms of the subject arrangement could be utilized without departing from the essence of the invention. For example, the first and second curves 70,72 could have different shapes and their point 74 of intersection could be at different locations depending on various operating parameters of the system. Likewise, the location of the vertical line 76 could be at different positions depending on the same or other operating parameters of the system.

INDUSTRIAL APPLICABILITY

In the operation of the subject embodiment, a directional input is made to the directional lever 60 to select the direction of travel. In the subject arrangement, with the speed pedal 56 in the initial zero position, the continuously variable transmission 10 accelerates to its maximum speed. To accomplish this acceleration, the microprocessor 22 receives the electrical signals representing the positions of the speed pedal 56 and the direction lever 60, processes the commands representing the operator's intent and directs the appropriate signals to the hystat control arrangement 16 and the clutch control arrangement 20. Initially, the hydrostatic transmission 14 increases the speed of the machine by adjusting the respective displacements of the variable displacement pump 44 and the variable displacement motor 48 and then controlling the respective speed clutches 36 or 38 and 40 to continue the increase in machine speed. Following actuation of the high speed clutch 36 or 38, further speed increases are accomplished by controlling the speed of the ring gear of the summing planetary arrangement 30. Once the desired maximum speed condition has been reached, the microprocessor 22 maintains the machine speed constant with no accelerating or retarding of the machine. If, due to the dynamic nature of the system, the machine speed "overshoots" (goes beyond) the designated value, the microprocessor 22 automatically takes the needed corrective action to adjust the speed accordingly.

As noted above, the hydrostatic transmission 14 is used to initiate travel form the zero speed condition. As observed from a review of line 70 in FIG. 2, during the first portion of the speed range of the hydrostatic transmission 14 the available torque is quite high. However, as the speed increases the torque level decreases. As the maximum speed of the hydrostatic transmission 14 reaches its maximum speed, the torque level decreases rapidly.

From a review of line 72 in FIG. 2, it is observed that the torque level of the combined hydrostatic transmission 14 and the mechanical transmission 18 decreases more slowly as the speed increases. As noted in FIG. 2, the respective torque curves 70,72 cross at the intersection point 74.

In order to make a smooth transition from power being transmitted from the hydrostatic transmission 14 to power being transmitted from the combined outputs of the hydrostatic transmission 14 and the mechanical transmission 18, the speed of the input to the continuously variable transmission 10 through the gear arrangement 21 as sensed by the speed sensor 62, must be substantially equal to the speed of the input arrangement 41 to the summing planetary 30. If the speeds thereof are not substantially the same, an uneven shift in power is felt. This normally results in a "jerk" in the machine operation. In the subject arrangement, when the low speed clutch 40 is engaged the speed of the motor output shaft 34, the speed of the final output shaft 28 and the speed of the input arrangement 41 are the same.

From a review of FIG. 2, it is noted that the ideal point of power transition is at the point of intersection 74 where the torque curves meet. However, this is not the synchronous point at which the speed through the gear arrangement 21 is substantially equal to the speed of the input arrangement 41 to the summing planetary arrangement 30. As noted above, the line 76 represents the point at which the speeds thereof are substantially equal. In order to provide a smooth transition of motive power when switching from the hydrostatic transmission mode to the combined hydrostatic transmission and mechanical transmission mode, the low speed clutch 40 is disengaged at the non-synchronous point or point of intersection 74 where the torque curves meet. Since as detected by the microprocessor 22, the speeds of the input to the continuously variable transmission 10 is not equal to the speed of the input arrangement 41 to the summing planetary 30, the forward high speed clutch 36 is not initially engaged. In the subject arrangement, the speed of the motor output shaft 34 is decreased in order to decrease the speed of the input arrangement 41 to the summing planetary arrangement 30. During this decrease in speed of the motor output shaft 34, the speed of the final output shaft 28 remains substantially the same. Once the speed of the input arrangement 41 to the summing planetary arrangement 30 is substantially equal to the speed of the gear arrangement 21, the high speed clutch 36 is engaged. Since, during this power transition, there is no noticeable change in torque or ground speed levels, the machine does not experience any sudden changes in power and consequently no "jerks" are noticed by the operator. The system operates in the same manner when moving in the reverse direction. The only difference being that the reverse high speed clutch 38 is used instead of the forward high speed clutch 36.

When the speed of the machine is being lowered to a point at which a transition is being made from the combined power of the hydrostatic transmission 14 and mechanical transmission 18 to the single power of the hydrostatic transmission 14, the reverse of the above occurs. Once the speed ratio is reached that relates to the point of intersection of the respective torque curves 70,72, the high speed clutch 36 is disengaged. Since the speed of the final output shaft 28 is not substantially equal to the speed of the motor output shaft 34, the low speed clutch 40 is not initially engaged. The speed of the motor output shaft 34 is increased in speed until it substantially equals the speed of the final output shaft 28. Once the speeds thereof are substantially equal, the low speed clutch 40 is engaged. During this transition, the speed of the output shaft 28 does not change and the torque level therethrough remains substantially constant. Consequently, the machine does not experience any sudden changes in power and the operator does not feel any "jerks" during the transition.

Thus, as set forth above and with respect to FIG. 3, the method for controlling the shift points in a continuously variable transmission with a closed loop control wherein the output of the continuously variable transmission is generated by a hydrostatic transmission or by a combination of the hydrostatic transmission and a mechanical transmission having a summing planetary and high and low speed clutches comprises the steps of sensing the input speed to the continuously variable transmission, sensing the output speed from the hydrostatic transmission, sensing the output speed of the continuously variable transmission, comparing an operative transmission speed ratio of the hydrostatic transmission or the combined hydrostatic transmission and the mechanical transmission to a predefined established transmission speed ratio, the predefined established transmission speed ratio being the point of intersection of a predefined torque curve of the hydrostatic transmission with a predefined torque curve of the combined hydrostatic transmission and the mechanical transmission, disengaging the high or low speed clutch in response to the operative transmission speed ratio of the hydrostatic transmission or the combined hydrostatic transmission and mechanical transmission reaching the predefined established transmission speed ratio, increasing or decreasing the speed of the output of the hydrostatic transmission when the input speed to the continuously variable transmission does not equal the speed to the summing planetary arrangement or the output speed of the hydrostatic transmission does not substantially equal the speed of the output from the continuously variable transmission, and engaging the other of the high speed clutch or the low speed clutch in response to the input speed to the continuously variable transmission substantially equalling the speed to the summing planetary arrangement or the output speed of the hydrostatic transmission substantially equalling the speed of the output from the continuously variable transmission so that the speed and output torque of the transmission before and after the shift is substantially equal.

In view of the foregoing, it is readily apparent that the subject method provides a process for controlling the shift points in a continuously variable transmission that is using a hydrostatic transmission and a combined hydrostatic transmission and a mechanical transmission to provide motive power to a machine throughout its entire speed range. The subject method enables the transition between the two modes of power to take place at a non-synchronous speed where there is no interruption in the machine speed and no sudden changes in the torque output during the transition.

Other aspects, objects and advantages of the invention can be obtained from a study of the drawings, the disclosure and the appended claims.

We claim:

1. A method for controlling the shift points in a continuously variable transmission with a closed loop control, the output of the continuously variable transmission being generated by a hydrostatic transmission and by a combination of the hydrostatic transmission and a mechanical transmission having a summing planetary and high and low speed clutches, the method comprising the steps of:

sensing the input speed to the continuously variable transmission;

sensing the output speed from the hydrostatic transmission;

sensing the output speed of the continuously variable transmission;

comparing an operative transmission speed ratio of one of the hydrostatic transmission and the combined hydrostatic transmission and the mechanical transmission to a predefined established transmission speed ratio, the predefined established transmission speed ratio being the point of intersection of a predefined torque curve of the hydrostatic transmission with a predefined torque curve of the combined hydrostatic transmission and the mechanical transmission;

disengaging one of the high and low speed clutches in response to the operative transmission speed ratio of the hydrostatic transmission reaching the predefined established transmission speed ratio;

disengaging the other one of the high and low speed clutches in response to the operative transmission speed ratio of the combined hydrostatic transmission and mechanical transmission reaching the predefined established transmission speed ratio;

changing the speed of the output of the hydrostatic transmission when the speed of the input to the continuously variable transmission does not substantially equal the speed to the summing planetary arrangement;

changing the speed of the output of the hydrostatic transmission when the output speed of the hydrostatic transmission does not substantially equal the speed of the output from the continuously variable transmission; and engaging the high speed clutch in response to the speed of the input to the continuously variable transmission substantially equaling the speed to the summing planetary arrangement so that the speed and output torque of the transmission before and after the shift is substantially equal;

engaging the low speed clutch in response to the output speed of the hydrostatic transmission substantially equaling the speed of the output from the continuously variable transmission so that the speed and output torque of the transmission before and after the shift is substantially equal.

2. The method of claim 1 wherein the high speed clutch of the mechanical transmission is a forward high speed clutch and the mechanical transmission includes a reverse high speed clutch and in the steps of disengaging one of the high and low speed clutches and engaging the other of the high and low speed clutches the reverse high speed clutch is operatively controlled when operating in a reverse direction.

3. The method of claim 1 wherein the step of changing the speed of the output of the hydrostatic transmission when the speed of the input to the continuously variable transmission does not substantially equal the speed to the summing planetary arrangement includes increasing the speed of the hydrostatic transmission when the speed of the input to the continuously variable transmission is greater than the speed to the summing planetary arrangement and the step of changing the speed of the output of the hydrostatic transmission when the output speed of the hydrostatic transmission does not substantially equal the speed of the output from the continuously variable transmission includes increasing the speed of the hydrostatic transmission when the output speed of the hydrostatic transmission is less than the speed of the output from the continuously variable transmission.

4. The method of claim 1 wherein the step of changing the speed of the output of the hydrostatic transmission when the speed of the input to the continuously variable transmission does not substantially equal the speed to the summing planetary includes decreasing the speed of the hydrostatic transmission when the output speed of the hydrostatic transmission is greater than the speed to the continuously variable transmission and the step of changing the speed of the output of the hydrostatic transmission when the output speed of the hydrostatic transmission does not substantially equal the speed of the output from the continuously variable transmission includes decreasing the speed of hydrostatic transmission when the output speed of the hydrostatic transmission is greater than the speed of the output from the continuously variable transmission.

* * * * *